(12) United States Patent
Müller

(10) Patent No.: US 6,349,963 B1
(45) Date of Patent: Feb. 26, 2002

(54) AIRBAG DEVICE

(75) Inventor: Olaf Müller, Rüsselsheim (DE)

(73) Assignee: INOVA GmbH Technische Entwioldungen, Rüsselsheim (DE)

( * ) Notice: Subject to any disclaimer, the term of this patent is extended or adjusted under 35 U.S.C. 154(b) by 0 days.

(21) Appl. No.: 09/531,291

(22) Filed: Mar. 20, 2000

(30) Foreign Application Priority Data

Mar. 18, 1999 (DE) ..................................... 299 05 000 U
Mar. 31, 1999 (DE) ..................................... 299 05 919 U

(51) Int. Cl.[7] ............................................. B60R 21/16
(52) U.S. Cl. ..................................... 280/728.3; 280/736
(58) Field of Search .......................... 280/728.2, 728.3, 280/731, 736, 732, 743.1, 742

(56) References Cited

U.S. PATENT DOCUMENTS

| | | | | |
|---|---|---|---|---|
| 4,097,064 A | * | 6/1978 | Ikawa et al. | 280/732 |
| 4,773,673 A | * | 9/1988 | Sakurai | 280/728.3 |
| 5,219,177 A | * | 6/1993 | Wang | 280/728.3 |
| 5,316,335 A | * | 5/1994 | Gray et al. | 280/728.3 |
| 5,344,184 A | * | 9/1994 | Keeler et al. | 280/730.1 |
| 5,375,875 A | * | 12/1994 | DiSalvo et al. | 280/728.3 |
| 5,899,488 A | * | 5/1999 | Muller | 280/728.3 |
| 5,924,722 A | * | 7/1999 | Koide et al. | 280/730.2 |
| 6,106,003 A | * | 8/2000 | Rahmstorf et al. | 280/728.3 |
| 6,170,862 B1 | * | 1/2001 | Hoagland et al. | 280/731 |

* cited by examiner

Primary Examiner—J. J. Swann
Assistant Examiner—David Divine
(74) Attorney, Agent, or Firm—Martin Fleit; Paul D. Bianco

(57) ABSTRACT

The invention pertains to an airbag device for a motor vehicle with at least one cover flap, behind which is a gas generator with which a gas bag can be inflated, and also moving drive devices that can be actuated by and are connected to each cover flap, where the latter is moved before or during triggering of the gas generator within the airbag device or within a part of the motor vehicle containing the airbag device. Furthermore, it is provided that the drive devices contain at least one piston running within a channel.

14 Claims, 8 Drawing Sheets

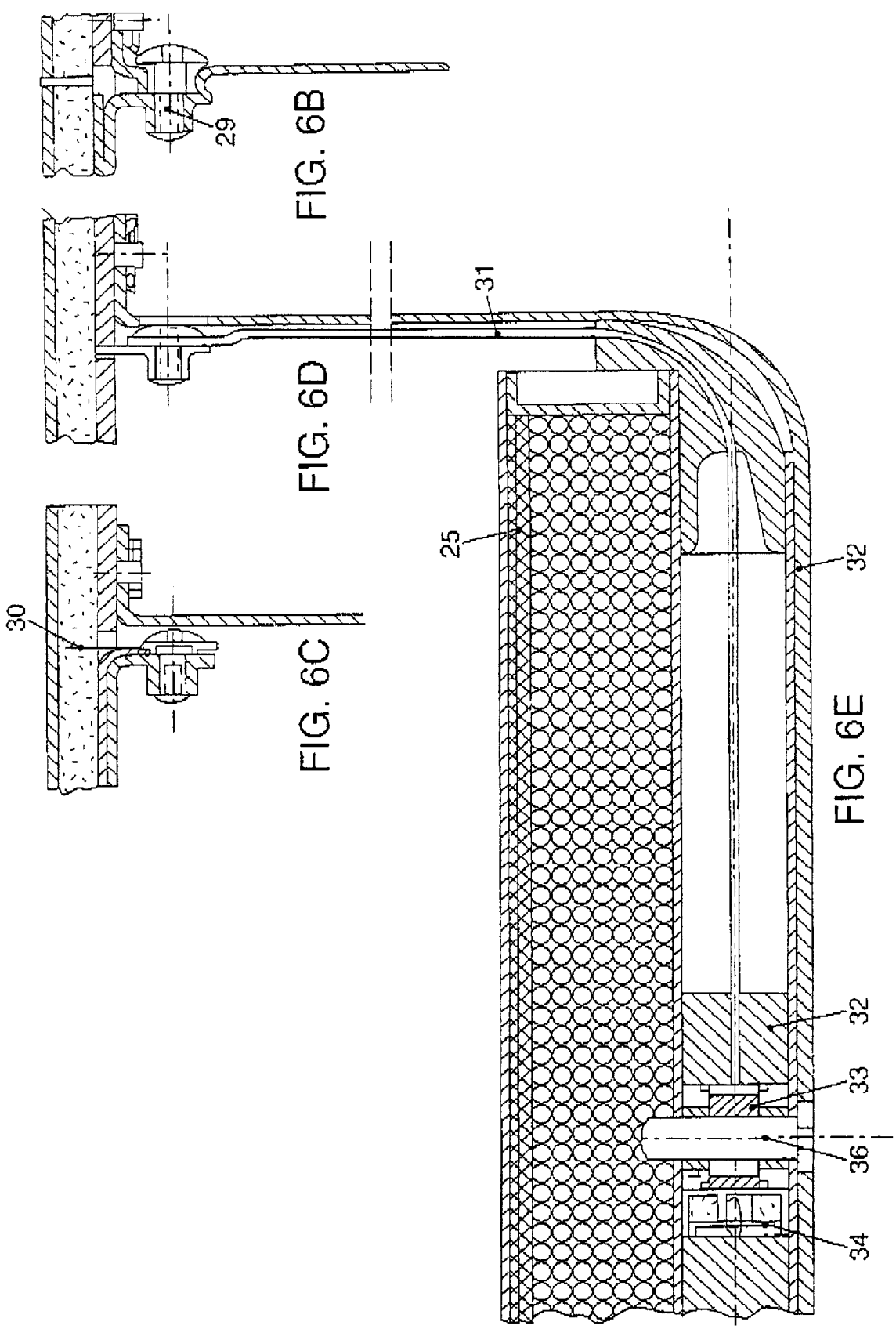

AIRBAG DEVICE

BACKGROUND OF THE INVENTION

1. Field of the Invention

The invention pertains to an airbag.

2. Prior Art

Airbag devices of the type described herein are generally known from the prior art. Motor vehicle airbag devices of this type have at least one cover flap, behind which is a gas generator with which a gas bag can be inflated, and also moving drive devices which can be actuated by and are connected to each cover flap, where the latter is moved before or during the triggering of the gas generator within the airbag device or within a part of the motor vehicle containing the airbag device.

SUMMARY OF THE INVENTION

The objective of the present invention is to further improve this type of airbag device, which already has significant favorable properties and functions well.

To achieve this goal, the invention provides for an airbag device with the properties as herein described.

Therefore, according to the present invention, an airbag device for a motor vehicle is provided with at least one cover flap, and behind which is situated a gas generator with which a gas bag can be inflated. Moving drive devices are connected to each cover flap for movement before or during the triggering of the gas generator within the airbag device or within a part of the motor vehicle containing the airbag device. The invention provides that the drive devices contain at least one piston running within a channel.

Since the corresponding airbag flap mechanism is used particularly on the passenger side of a motor vehicle, the invention contributes toward a further increase in passenger safety, for example. In addition, in the present invention it is preferred that the airbag device be of modular embodiment or that it be a complete module.

In refinement of the invention, drive pressure generating devices are provided that contain the gas generator and/or gas generator devices separate from it.

Preferably, in an airbag device according to the present invention, the drive pressure generating devices are sealed gastight to the channel, and the piston is a pressure vessel sealed against the channel and the drive pressure generating devices. In this case, the drive pressure generating devices can be formed by the gas generator.

In a preferred refinement of the present invention, control devices are provided that guide the compressed gas generated by the gas generator into the gas bag as soon as the pressure vessel has reached a specified position in the channel. This can be achieved in that the control devices contain gas leadthroughs to the gas bag that pass through the channel wall, where said gas leadthroughs are released as soon as the pressure vessel has reached a specified position in the channel. Alternatively, it is also possible that the control devices contain gas leadthroughs to the gas bag that pass through the channel wall and also passage openings through the pressure vessel wall, and that the gas leads through the channel wall and the passage openings through the pressure vessel wall are aligned in the channel in a specified position of the pressure vessel and release a gas discharge into the gas bag.

In an additional refinement of the invention, the channel is formed by a guide vessel within which the piston runs.

Furthermore, with regard to an airbag device according to the present invention, it is preferred that the housing of the gas generator, the channel and/or the piston be made of sheet metal or as an extruded section.

Furthermore, with regard to an airbag device according to the present invention, it is provided that the drive devices contain at least two pistons running within one channel or each within a single channel. Within the framework of the invention, this attribute can be refined in that the pistons are coupled for synchronized movement of all pistons. In this regard it is possible that each piston be coupled to a toothed rack for synchronized movement of all pistons and that all toothed racks engage with gear devices.

An additional advantage of the present invention provides that each cover flap of the airbag device and a vehicle part surrounding the cover flap in its closed position contain a common cover layer and that disconnection devices be provided that weaken or disconnect the cover layer at least approximately and partially along its perimeter before or during a movement of each cover flap.

In another refinement of the airbag device according to the present invention, the gas bag is folded before triggering of the airbag device so that during introduction of a gas, it will inflate at least essentially outwardly from the middle.

Preferably, the gas generator is a multi-stage gas generator.

In addition, in the airbag device according to the present invention, it is preferred that a piston be coupled by means of pulling elements to at least one cover flap.

In another favorable refinement of the invention, guide rings are provided for each cover flap.

Additional favorable configurations of the invention will be specified below.

The generator of the airbag device within the framework of one embodiment is produced preferably from steel. It is encased on the side with the pressure vessel with a guide vessel as a channel and is connected by welding or clinching, e.g., there is a pressure vessel as piston running in the guide vessel and it is thus supported over a large area and sealed. The guide vessel and pressure vessel each consist of a middle part and two front walls of shaped sheet metal. The three parts are each welded at the corners. With regard to the guide vessel, the front walls can also be overlapped with a flange and clinched.

The generator of the airbag device can alternatively be made of extruded, light metal. If necessary, two generator stages as chambers can be each introduced with series-connected noise-particle-and fire-absorption chambers. Also, the attachment of the airbag material is integrated with the guide vessel, just like a guide and support of the pressure vessel. Gas passage holes and propellant openings are installed with "scissors" tools. The front sides consist preferably also of extruded parts to guide the pressure vessel and for attachment of the bag. After welding of the "pressure cover" they will also preferably be sealed shut. To seal off and to guide the pressure vessel, four additional, extruded corner pieces can be used, for example, which can likewise be welded on.

Based on experiments, it can be readily determined whether the pressure vessel in actual cases of use should be coated, with POM for example, to simplify or promote unhindered sliding, and whether at its upper edge an additional gasket opening under pressure should be provided (see FIG. 4).

At the end of the movement of the pressure vessel in the guide vessel, gas passage holes, or more precisely gas leadthroughs, for example, through the channel wall and the passage openings through the pressure vessel wall to the cover come to coincide and allow the gas that was used to move the pressure vessel to flow into the bag and be inflated in a first step.

In the airbag generator, for example, for the passenger side, according to another embodiment preferably integrated, opposing pistons can be installed, whose pyrotechnic pressurization generates a force that moves the airbag flap(s). In this case, a pyrotechnic cartridge between the pistons, for example, will be ignited. The ignition of the pyrotechnic cartridge also ignites the propellant, e.g., of a first stage of the airbag generator. In order for both pistons to operate synchronously, a gear wheel is installed between them (see FIGS. 6 and 7), into which the pulling elements formed as gear rack engage as a kind of spring steel strip. Thus, the movement of the pistons is synchronized via the gear rack and engage with the central wheel.

Additional preferred and favorable configurations of the invention are obtained from the teachings herein.

BRIEF DESCRIPTION OF THE DRAWINGS

The invention will be explained in greater detail below based on embodiment examples presented in the drawings, but the invention is not limited to them. Shown are.

DETAILED DESCRIPTION OF PREFERRED EMBODIMENTS

Figure 1:
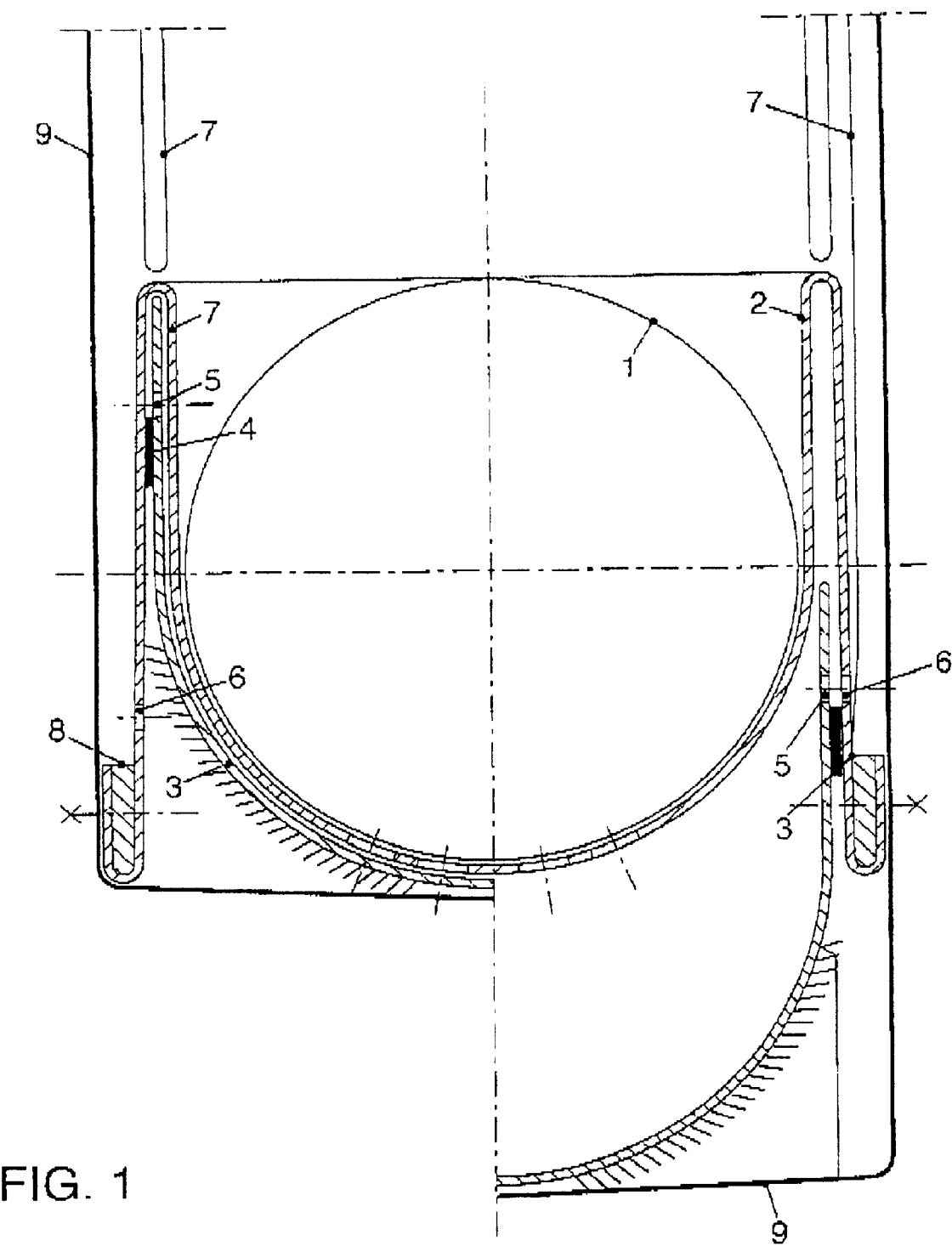
FIG. 1 a cross section through a part of a first embodiment of the airbag device (left-half of figure) and after triggering (right-half of figure), FIG. 2 a cross section (left-half of figure) through a portion and also an external view (right-half of figure) of a second embodiment of the airbag device, FIG. 3 analogously, an additional cross-sectional view (left-half of the main figure) and outer view (right-half of the main figure) of the second embodiment of the airbag device of FIG. 2 with two additional sections, FIG. 4A a cross-sectional view of a third embodiment of an airbag device before (left-half of figure) and after triggering (right-half of figure), FIG. 4B an enlarged detail from FIG. 4A, FIG. 5 a cross-sectional view of a fourth embodiment of an airbag device, FIG. 6A–E cross-sectional views of the drive components of the fourth embodiment of the airbag device of FIG. 5 in accordance with the perforations in FIG. 5, and FIG. 7 a cross-sectional view of a sixth embodiment of an airbag device.

In the individual figures of the drawing, the same or similar parts, or parts with the same or similar function, have been provided with the same reference numerals or are illustrated comparably, so that parts and their combinations, functions and mode of operation will be readily evident to an ordinary person skilled in the art, from viewing the figures and illustrations individually, by comparison of the figures and/or from the following descriptive information, and without additional information, even when there are no explicit or implicit references stated or presented between individual figures and/or between figures and text.

To avoid unnecessary repetition and restatement of known structures particularly as they pertain to the control and operation of the opening of the cover flaps of the airbag device, such details will not be elaborated on since they are well known to those of skill in the art.

FIG. 1 shows a cross section of a gas generator 1 of a first embodiment example of an airbag device. There is a guide and sealing vessel 2 attached around this gas generator 1 by welding or clinching. This guide and sealing vessel 2 has the illustrated shape and forms a channel to control an inserted pressure vessel 3 as a piston. At the end of the guide and sealing vessel 2, the sheet metal plate from which it is manufactured is shaped in such a manner that a gas bag or airbag 7 can be attached with wedge-shaped strips 8. The guide and pressure vessels 2 or 3 are provided with a number of gas leadthroughs 6 (through the channel wall) and transit openings 5 (through the pressure vessel wall), so that they coincide at a specified or predefined end position of the pressure vessel 3 so that the pressure in the pressure vessel 3 can exit through these transit openings 5 and gas leadthroughs 6 to inflate the bag or gas bag 7.

The airbag device thus has two working cycles: first is a "flap opening cycle," followed by a "gas bag inflation cycle."

There is a gasket 4 located between the pressure vessel 3 and the guide vessel 2. Surrounding the pressure vessel 3 normally there are pulling elements 9 which are designed in the present embodiment example as double pulling elements. The front sides of the gas generator 1, the guide and sealing vessel 2 and the pressure vessel 3 shown in cross sections for the two states in FIG. 1, are configured in the same way and are welded at a right angle to the middle part of the given vessel.

Figure 2:
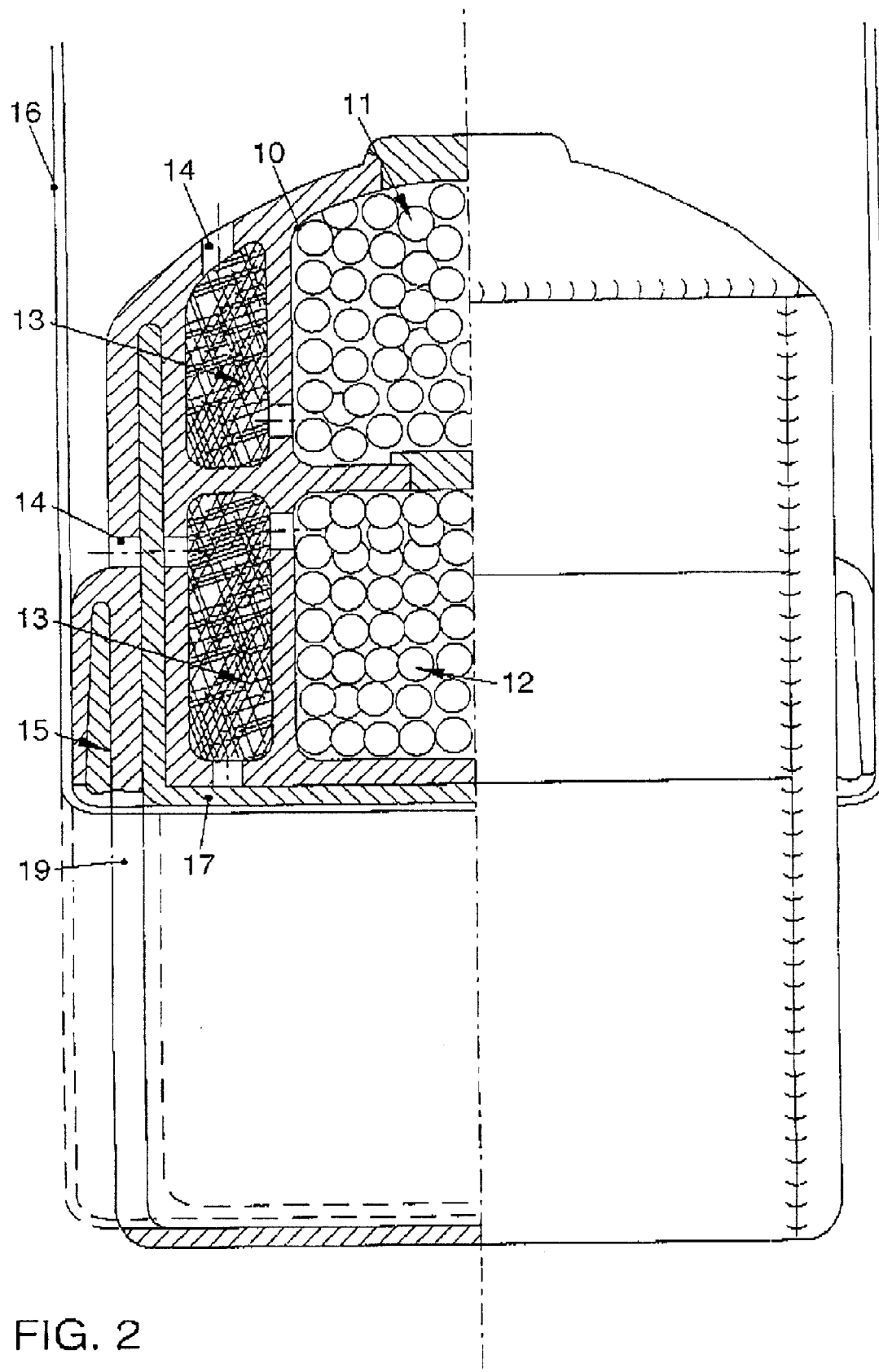

FIG. 2 shows an alternative to the airbag device of the invention with two-stage gas generator 10 made of a light metal extruded profile. It is possible to mold not only the first 12 and the second chamber 11 of a two-stage gas generator 1, but likewise spaces 13 for particle absorbers. All chambers 11, 12, 13 are connected to gas transit holes 14, which are formed in the technically conventional manner with "scissors" tools. Likewise, in the housing of the gas generator 10 there is an integrated gas bag or bag mount 15. The molded light metal pressure vessel 17 is likewise run into the extruded housing of the gas generator 10, which thus simultaneously forms the channel. The pulling elements 16 for opening the flap are located on the pressure vessel 17 and run through slots 19.

Figure 3:
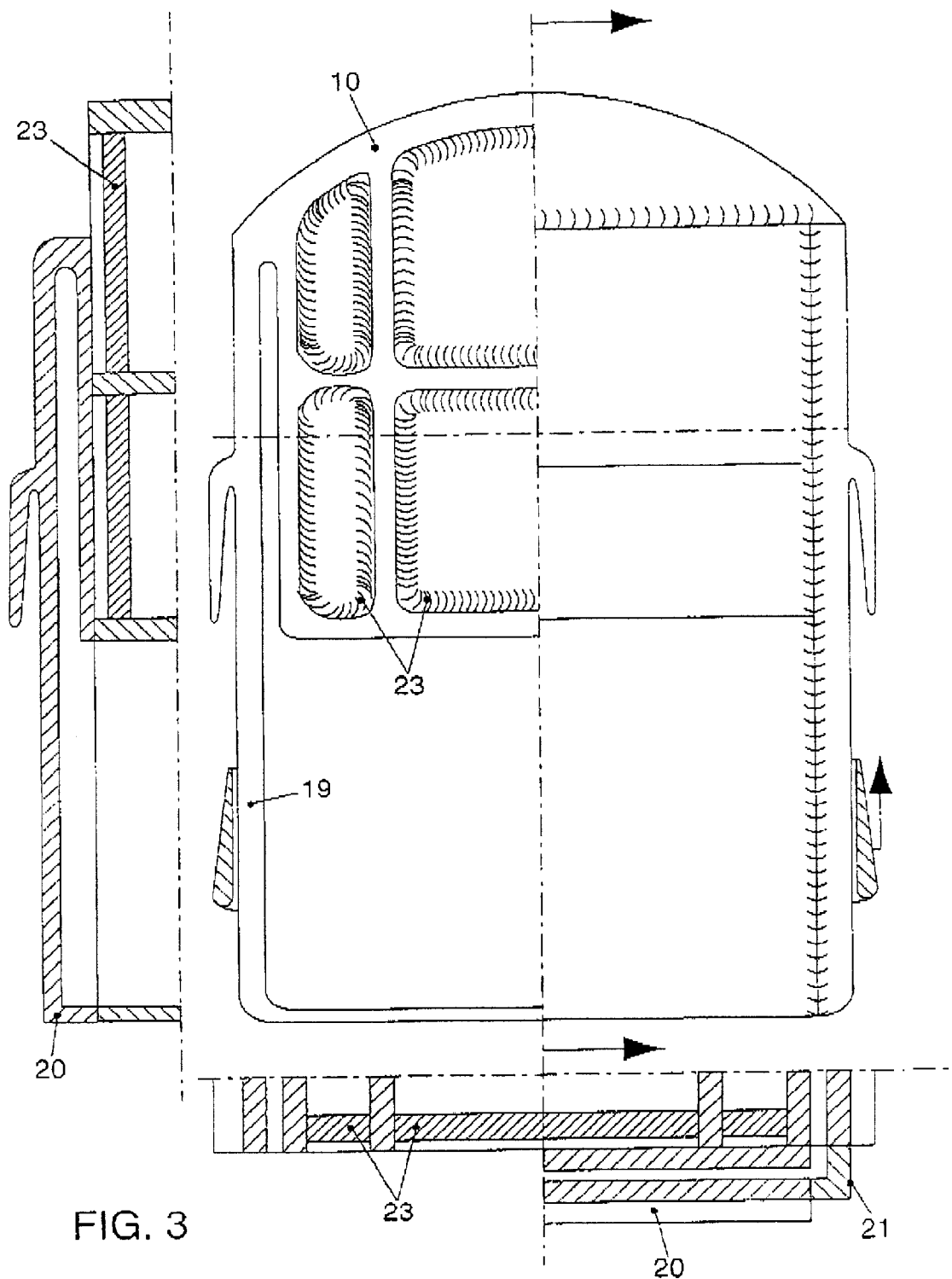

FIG. 3 shows a cross section of the extruded profile and presents the front walls 20 of the embodiment example according to FIG. 2. Shown is a front guide of the pressure vessel 17 welded to the housing of the gas generator 10. Similar to the housing of the gas generator 10 according to the first embodiment example (see FIG. 1), the bag mount 15 is also integrated here. The gas bag or airbag (not illustrated in this view) is attached in the bag mount by wedge-like strips. In order to seal off the pressure vessel 17, there are also four extruded corner clips 21. In front of the housing 10, the front wall plates 20 and the corner clips 21 are welded together, the pressure cover 23 is installed and welded into the chambers exposed to primary pressure.

The function of the airbag device of the invention will be explained in greater detail below with reference to FIGS. 1 to 3.

Upon ignition of the airbag, the bag is not first placed under pressure, as is technically commonplace today, so that the airbag flap is suddenly and violently pushed open, but rather on the back side of the airbag there is a so-called pressure vessel installed in a guide and sealing vessel surrounding the generator and attached to it. In order to set the pressure vessel in motion, it is first exposed to the gas pressure which is flowing through coincident holes in the generator housing and the guide vessel. Then pulling elements are attached to this moving pressure vessel, for example, four elements that pull the vessel into the module due to connection to the airbag flap(s.

Figures 4A, 4B:
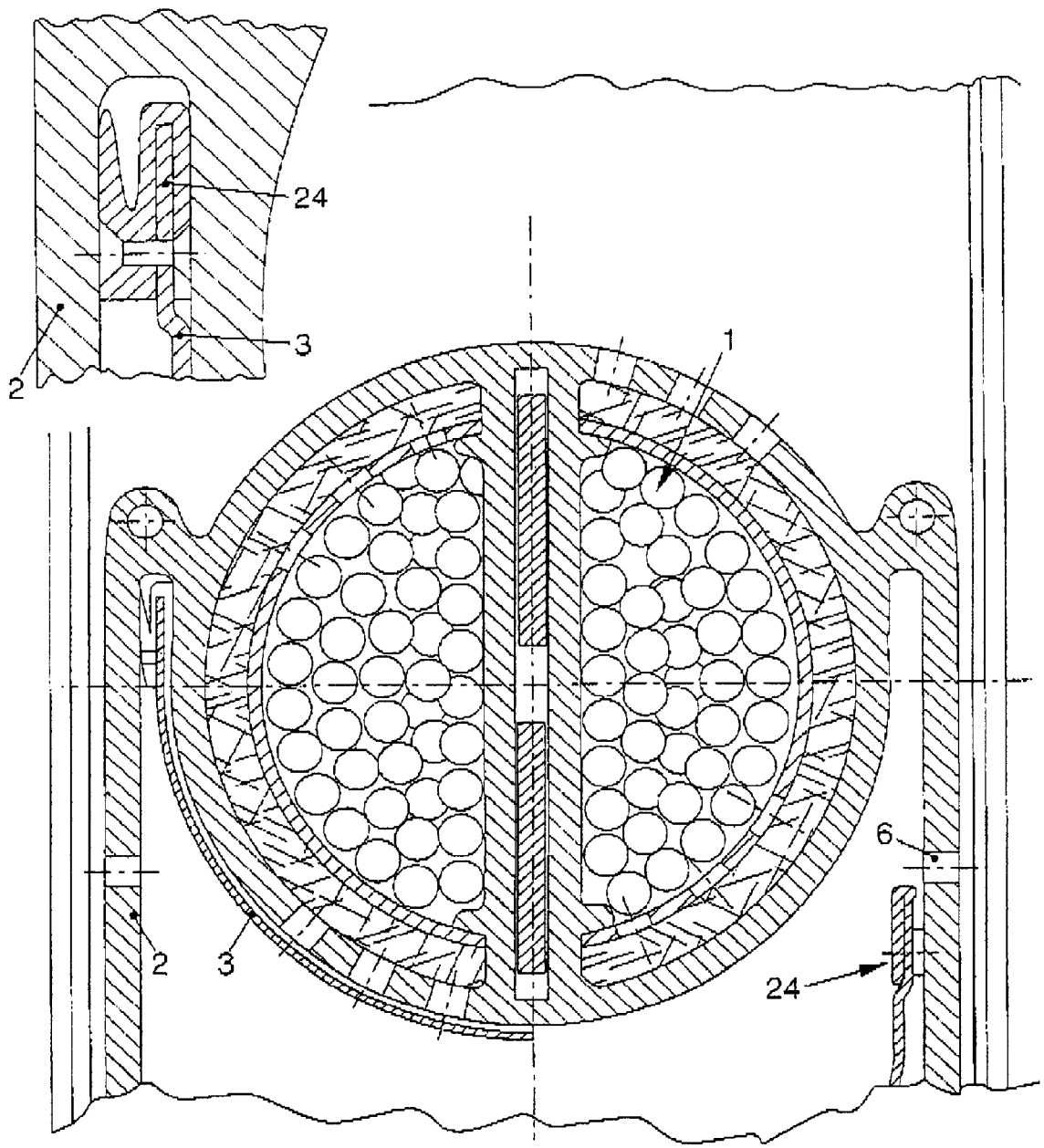

FIGS. 4A and 4B show another alternative to an airbag device according to the invention with the upper edge of the pressure vessel 3 or 17 having a gasket 24 which is shaped so that it seals better at higher pressure.

Figure 5:
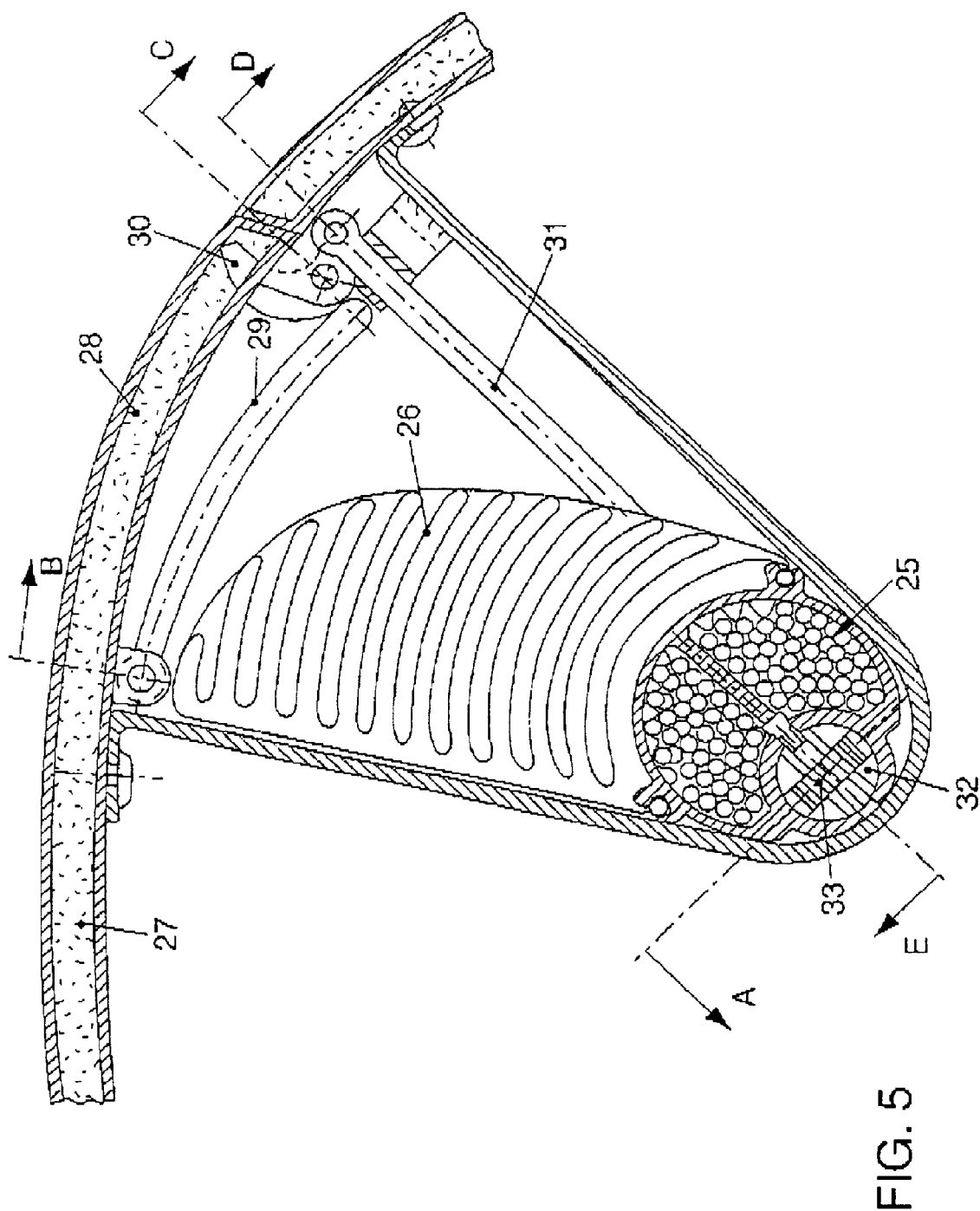
Figure 6A:
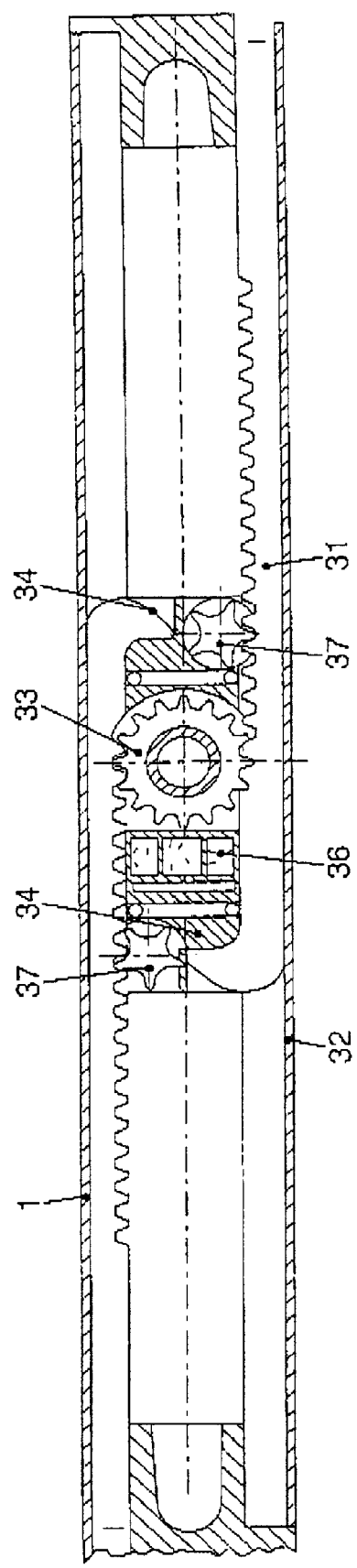

FIG. 5 shows an additional, alternative airbag device with contracting cover flap 28. The figure shows a two-stage gas generator 25, the airbag or gas bag 26, an instrument panel housing 27 and a flap guide 29. Furthermore, as an alternative, a film-cutting blade 30 is shown as a constituent part of separating devices which tips when pulled over the pulling elements 31 and cuts the common film or the general covering layer of the covering flap 28 and of the instrument panel 27.

FIGS. 6A, 6B, 6C, 6D and 6E refer to the embodiment example of an airbag device according to FIG. 5 and show a cylinder 32 integrated in (or on) the gas generator 1 and having built-in, opposing pistons 34 based on different cross-sectional views that present additional details. There is a pyrotechnic cartridge 36, whose ignition sets the pistons 34 in motion between these pistons 34. To ensure that both pistons 34 pull on the airbag flap or covering flap 28 (see FIG. 5, for example) at the same time, the pulling elements 31 are designed as gear racks and are configured so that they engage on both sides with a gear wheel 33, so that only synchronous movement of the pistons 34 is possible. To avoid leaks at the site where the gear rack of the pulling element 31 passes through the piston 43, one sealing gear wheel 37 is provided for each.

The function of the embodiment alternative shown in FIGS. 5 and 6 will be explained below.

In order to pull the airbag flap inward, the pulling elements are attached to two opposing pistons which are driven by an intermediately positioned pyrotechnic charge. The movement in the small space takes place before the inflation of the airbag. The airbag generator can be ignited with the same igniter via a connecting hole, or it can have a separate, temporally shifted, electrical ignition.

Figure 7:
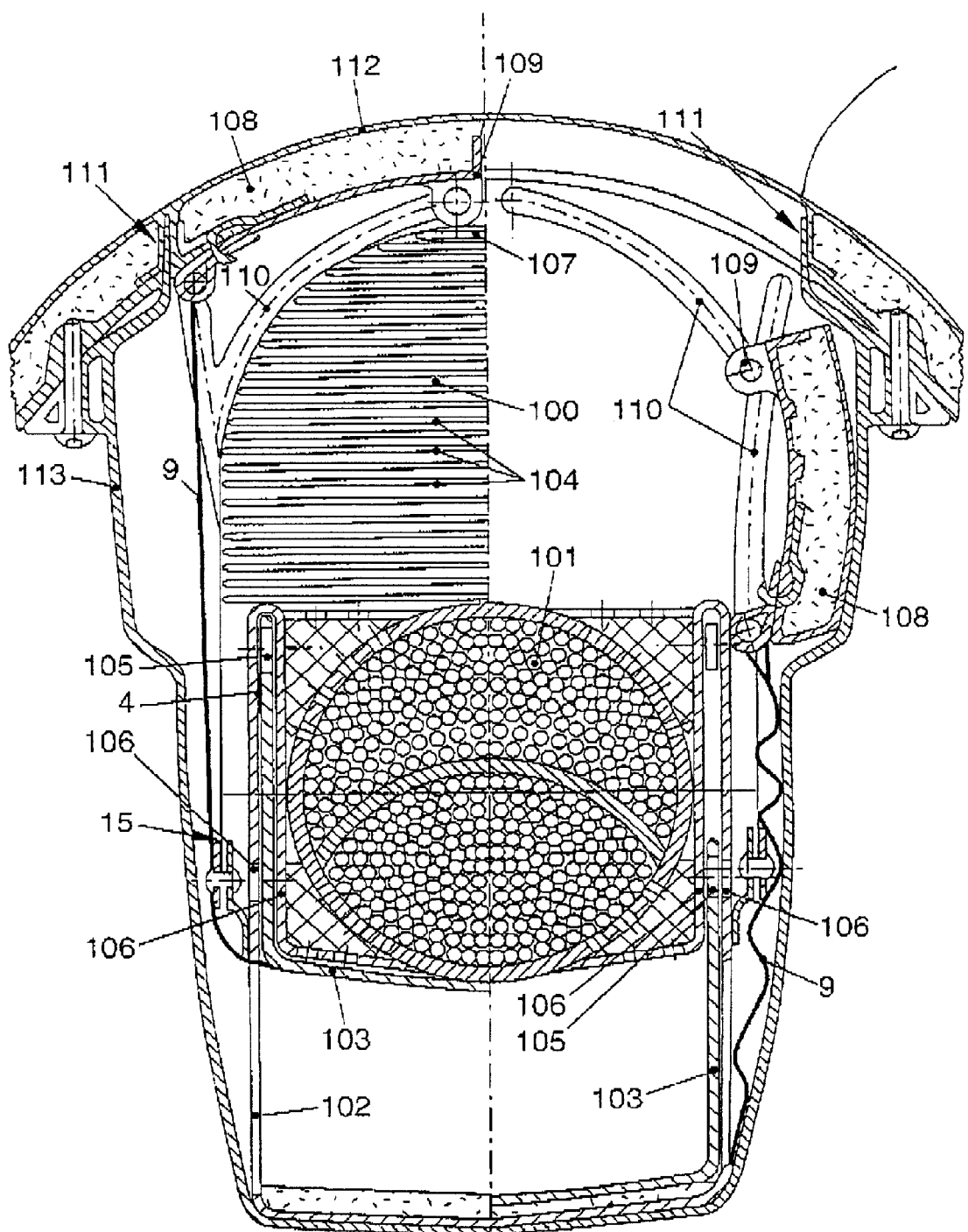

FIG. 7 shows a double-stage airbag generator 101 in a cross-sectional representation with a guide vessel 102 surrounding it, in which a pressure vessel 103 is seated. The pressure vessel 103 and the guide vessel 102 are designed with gas leadthrough openings 106 (through the channel wall) and passage openings 105 (through the wall of the pressure vessel), so that after a pyrotechnically driven displacement of the pressure vessel 103, a passage for the gas from the pressure vessel 103 and the gas generator 101 into the airbag or gas bag 100 is produced in the first stage. As the figure shows, the airbag 100 is attached accordingly to the guide vessel 102.

An additional, special feature of the invention is the folding of the airbag 100 in such a manner that it is positioned in cross layers 104 one on top of the other. During injection of the gas, it is directed to the perimeter of the bag first into the top layer 107, and after its inflation, it pulls up the next fold, and so on, until the last layer.

In addition, bolts 109 pass through the ends of the cover flaps or airbag flaps 108 into slots 110 so that a precise movement will result.

Another special feature is the positioning of "blades" 111 for cutting through the film 112 during the pulling down of the flap(s) 108. These blades 111 are attached to the module housing 113 of the airbag device or are separately attached (not shown).

The attached figure shows one sample application of an airbag device in which a two-stage generator is surrounded by a guide vessel which supports the pressure vessel. Using the two-cycle principle, the gas that first moves the pressure vessel, is "flushed" through appropriately located openings from the pressure vessel through the guide vessel into the gas bag and inflates it entirely or only in the first stage.

Furthermore, fixed blades are provided so that during contraction of the flap(s) their film binding is severed.

The "double" control of the airbag flaps allows a precise, predefined movement of the flaps. The movement of the flaps by the pulling elements (cords, bands, etc.) is structured so that they must open the flaps only in part. The deployed bag presses them fully into the open position.

The airbag or gas bag is folded in such a manner, and is inflated beginning with the top fold so that the fabric smoothly inflates fold by fold.

Due to the arrangement of generator, guide and pressure vessel and the gas overflow channels, a low-cost, feasible structural unit is created for a "Smart Bag" with contracting flaps.

The individual features and properties of the present invention lead to the following advantages, among others:

1. Easy opening of the flaps due to assistance of "blades."
2. Motion kinematics of the flaps so that they are initially elements and then by the bag.
3. Guide and pressure vessel are positioned within each other so that they are supported, sealed and controlled as a unit.
4. Overflow openings allow the gas first to open the flaps and then to inflate the bag.
5. The gas bag is folded in layers so that it is inflated beginning with the top layer so that the bag deploys smoothly.
6. Flaps that are guided at both ends result in precision defined movement. In summary, FIGS. 1 to 7 show alternatives to a mechanical system that uses the pyrotechnic pressure to pull the airbag flap into the airbag module, or in general, to pull the airbag device in order to prevent injury to the occupants due to the flap and not to allow the airbag to deploy aggressively.

The properties and combination of properties presented above and in the figures for all discussed embodiment variants are used solely to illustrate examples of the invention and are not intended to restrict it. The scope of the disclosure of the entire documentation presented herein is determined by what is already evident to an ordinary person skilled in the art from the claims, but also in light of the known prior art. In particular, the invention also encompasses all variants, modifications and substitutions that the ordinary person skilled in the art can derive from the entire scope of the disclosure. In particular, all individual properties and potential configurations of the invention and their embodiment examples can be combined with each other.

What is claimed is:

1. Airbag device for a motor vehicle with at least one cover flap, and behind which is a gas generator with which a gas bag can be inflated, comprising at least one moving drive device which can be actuated by and is connected to said at least one cover flap, to move the cover flap before or during triggering of the gas generator within the airbag device or within a part of the motor vehicle containing the airbag device, the at least one drive device containing at least one piston comprised of a pressure vessel running within a channel, a drive pressure generating device sealed gastight to the channel to drive the piston by gas received from a gas generator, the piston being sealed against the channel and the drive pressure generating device, and a control device to guide compressed gas into a gas bag generated by the gas generator provided therefor as soon as the pressure vessel has reached a specified position in the channel.

2. Airbag device according to claim 1, wherein the drive pressure generating device is formed by the gas generator.

3. Airbag device according to claim 1, wherein the control device contains gas leadthroughs to the gas bag that pass through a channel wall, said gas leadthroughs being active as soon as the pressure vessel has reached a specified position in the channel.

4. Airbag device according to claim 1, wherein the control device contains a gas leadthrough to the gas bag passing through a channel wall and also a gas leadthrough is provided through a pressure vessel wall, wherein gas leadthroughs through the channel wall and through the pressure vessel wall are aligned in the channel in a specified position of the pressure vessel and release a gas discharge into the gas bag.

5. Airbag device according to claim 1, wherein the channel is formed by a guide vessel within which the piston runs.

6. Airbag device according to claim 1, wherein one or more of the housing of the gas generator, the channel and the piston are made of sheet metal or as an extruded section.

7. Airbag device according to claim 1, wherein the drive device contains at least two pistons running within a single channel or each within its own channel.

8. Airbag device according to claim 7, wherein the pistons are coupled for synchronized movement.

9. Airbag device according to claim 8, wherein each piston is coupled to a toothed rack for synchronized movement of all pistons and that all toothed racks engage at least one toothed gear device.

10. Airbag device according to claim 1, wherein the cover flap and a vehicle part surrounding said cover flap in its closed position contain a common cover layer and a disconnection device is provided to weaken or disconnect the cover layer at least partially along, the perimeter of the cover flap before or during movement of the cover flap.

11. Airbag device according to claim 1, wherein the gas bag is folded before triggering of the airbag device so that during introduction of a gas, it inflates at least essentially outwardly from the middle.

12. Airbag device according to claim 1, wherein the gas generator is a multi-stage gas generator.

13. Airbag device according to claim 1, wherein the piston is coupled to pulling elements coupled to the covering flap.

14. Airbag device according to claim 1, wherein a guide is provided to control the covering flap.

* * * * *